United States Patent [19]

King

[11] Patent Number: 4,903,290
[45] Date of Patent: Feb. 20, 1990

[54] DEVICE FOR MOUNTING A TELECOMMUNICATIONS DEVICE FOR THE DEAF IN A PUBLIC PHONE BOOTH

[76] Inventor: Bruce A. King, 3956 Downes Dr., Indianapolis, Ind. 46236

[21] Appl. No.: 222,910

[22] Filed: Jul. 22, 1988

[51] Int. Cl.[4] .................. H04M 1/2; H04M 11/00; H04M 17/02
[52] U.S. Cl. ..................................... 379/52; 379/155; 379/453
[58] Field of Search ............... 379/52, 155, 441, 445, 379/447, 453; 312/100, 233, 322, 323; 248/240.1, 293

[56] References Cited

U.S. PATENT DOCUMENTS

| | | | |
|---|---|---|---|
| 2,822,230 | 2/1958 | Curran | 312/100 |
| 2,982,593 | 5/1961 | Chambers | 312/100 |
| 3,275,279 | 9/1966 | Caldwell | 312/233 |
| 4,323,290 | 4/1982 | Hickman | 312/100 |
| 4,777,469 | 10/1988 | Engelke | 379/96 |

FOREIGN PATENT DOCUMENTS 329139  5/1930 United Kingdom ............... 312/322

OTHER PUBLICATIONS

Micon MCM, 5/21/80, Micon Industries.

*Primary Examiner*—Keith E. George
*Attorney, Agent, or Firm*—Woodard, Emhardt, Naughton Moriarty & McNett

[57] ABSTRACT

A device for mounting a telecommunictions device for the deaf ("TDD") to a pay telephone booth which provides an enclosure for storing the TDD when not in use, and a mechanism for attaching the TDD to the booth so that it can be moved between a position where it is contained within the enclosure to a position where the handset of the telephone may be received in the handset cradle of the TDD to provide access to public telephone to the deaf and hearing impaired.

3 Claims, 3 Drawing Sheets

DEVICE FOR MOUNTING A TELECOMMUNICATIONS DEVICE FOR THE DEAF IN A PUBLIC PHONE BOOTH

BACKGROUND OF THE INVENTION

1. Field of the Invention

This invention relates to a device for mounting appliances in a public telephone booth and more particularly to a device for mounting a telecommunications device for the deaf in a telephone booth.

2. Description of the Prior Art

Deaf and hearing impaired people are unable to use standard telephones for communication unless they and the party with whom they are communicating both have a telecommunications device for the deaf ("TDD"). TDD's typically have a cradle for receiving a telephne handset, a keyboard for typing in outgoing messages, a means for converting typed messages to signals which can be transmitted over telephone lines and a means for converting signals received over telephone lines to a visual display. Thus, TDDs are often fairly large in size and are too cumbersome to make portability practicable. Therefore, TDDs are typically used only in the home or office environment. Because it is not practical for a deaf or hearing impaired person to carry TDDs around with them, the deaf and hearing impaired are essentially denied access to public telephone booths.

The inventor is unaware of any prior art which discloses a TDD mounted in a public telephone booth. However the inventor is aware of two U.S. Patents which disclose public telephone booths with devices therein for holding telephone directories. These patents are Chambers (U.S. Pat. No. 2,982,593 issued May 2, 1961) and Hickman et al. (U.S. Pat. No. 4,323,290 issued Apr. 6, 1982).

Chambers discloses a telephone booth with an enclosure therein to store and protect a telephone directory which is secured to the telephone booth to prevent theft or misplacement. Chambers secures the directory to the phone booth with a cable or wire unlike the present invention which uses a means for sliding and pivoting the TDD into its operation position. Chambers does not appear to teach or suggest storing a TDD in a public telephone booth.

Hickman et al. discloses a telephone enclosure with a directory holder which can be rotated from a closed position to an open position. Hickman et al. does not appear to teach or suggest storing a TDD in a public telephone booth.

SUMMARY OF THE INVENTION

One embodiment of the present invention is a device for providing public telephone services to the hearing impaired which has a coin operated telephone with a handset mounted to a housing, a TDD having a handset cradle designed and arranged to receive a telephone handset when said TDD is in use, an enclosure mounted to the housing which is sized to receive the TDD and positioning means attached to the TDD and the housing for positioning the TDD between a first position wherein the TDD is received within the enclosure and a second position wherein the TDD is adjacent the coin operated telephone so that the handset can be received in the handset cradle.

One object of the present invention is to provide a device which grants the deaf or hearing impaired access to a public telephone booth which may also be used by the general public.

A second object of the present invention is to provide a device for securing a TDD in a public telephone booth in a way which deters theft of the device.

Other objects and advantages of the present invention will be apparent from the following description.

DESCRIPTION OF THE PREFERRED EMBODIMENT

Figure 1:
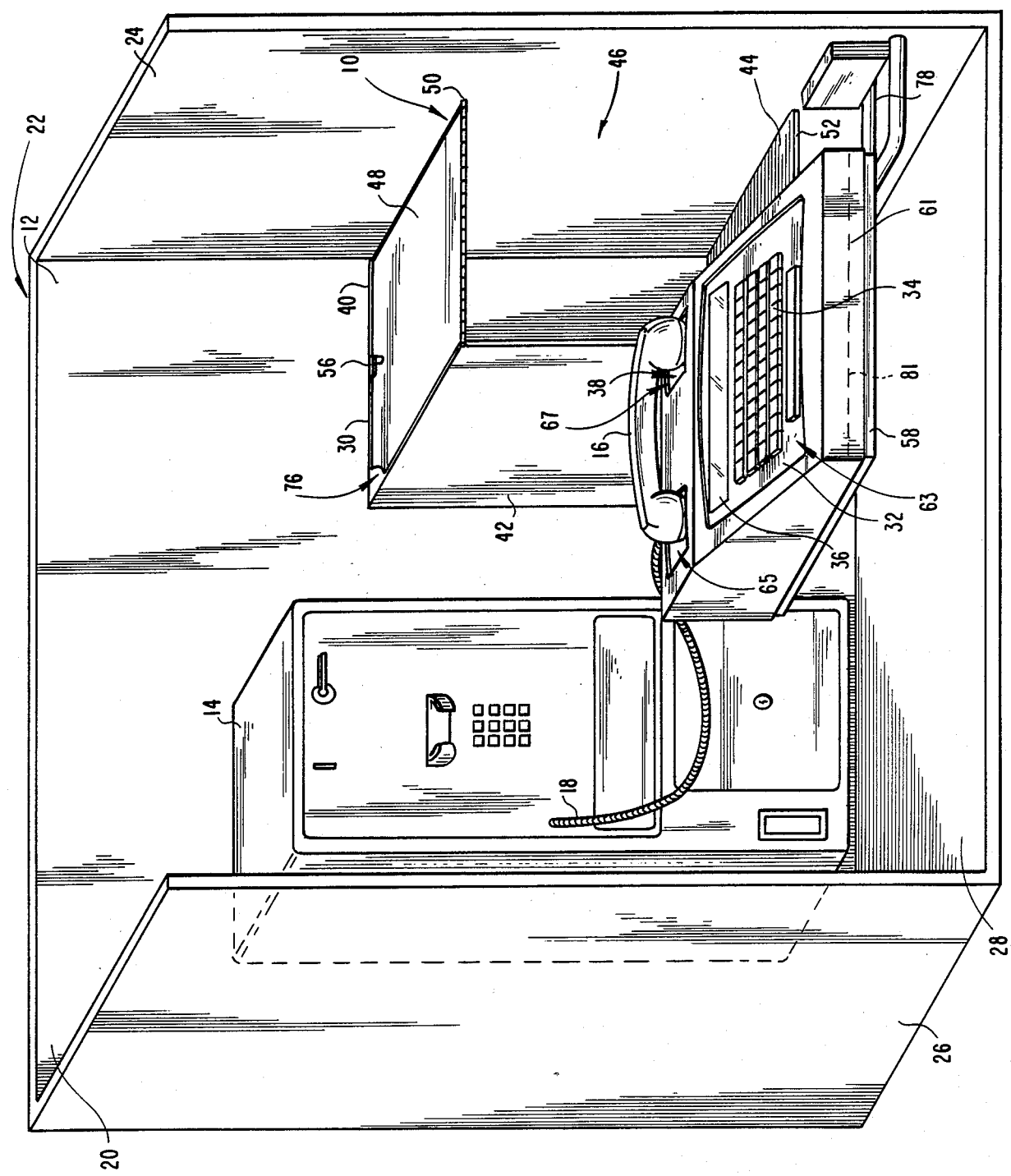
FIG. 1 is a perspective view of one embodiment of a device for mounting a TDD in a telephone booth with the TDD being in its in use position.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
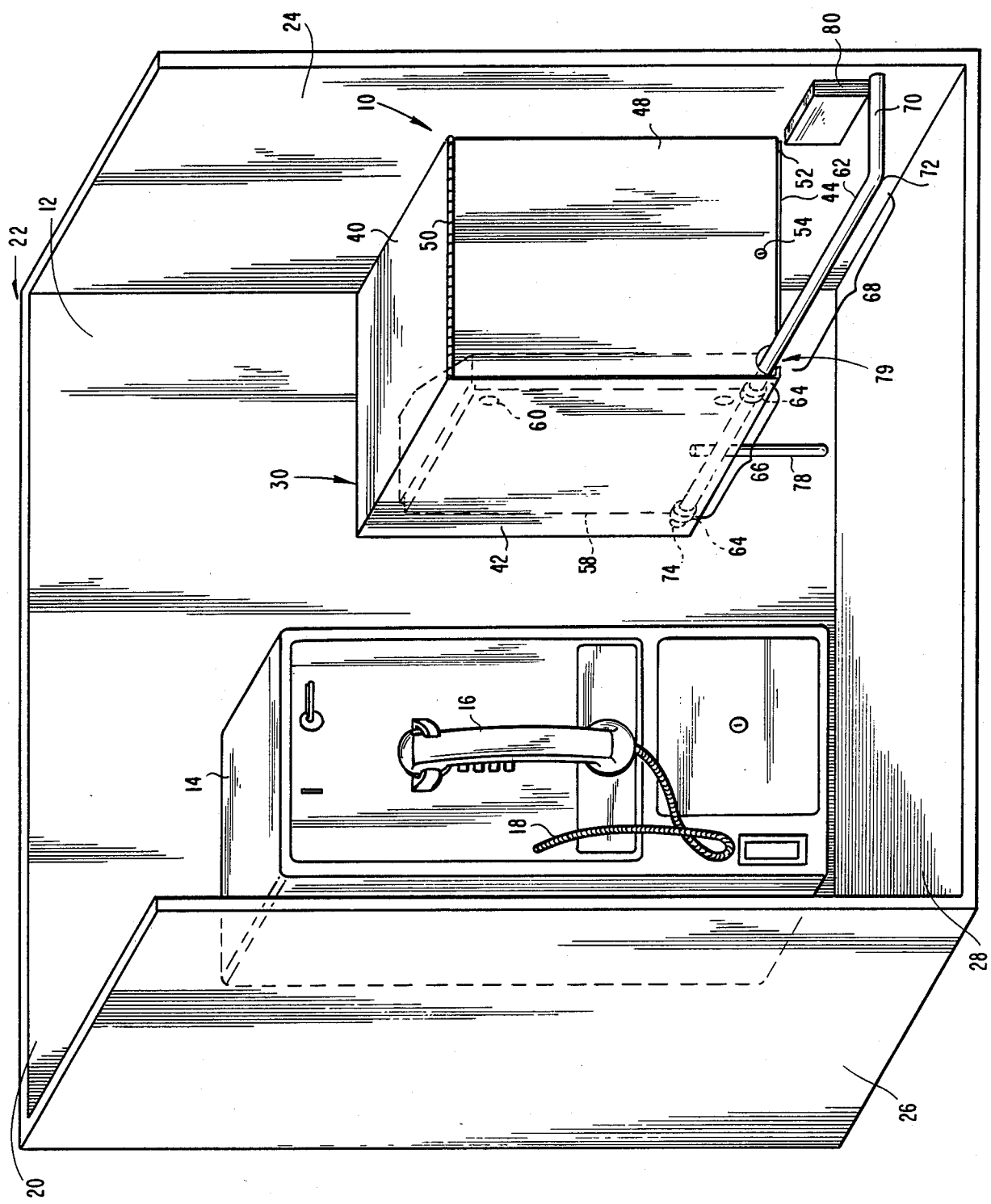
FIG. 2 is a perspective view of the device for mounting a TDD in a telephone booth of FIG. 1 with the TDD being in its stored position.

Referring to FIGS. 1 and 2 there is illustrated an embodiment of a device 10 for mounting a TDD in a public phone booth 12. Booth 12 is similar to the kind typically found in office buildings, airports, bus stations and the like. The booth 12 consists of a coin cooperated telephone 14 with a handset 16 connected by a cord 18 to the remainder of the coin operated telephone 14. The telephone 14 is mounted to back wall 20 of a housing 22 which also has sidewalls 24 and 26 extending in a rectilinear fashion from the back wall 20. The booth 12 is also provided with a writing shelf 28.

Mounted to sidewall 24 and back wall 20 is an enclosure 30 for storing a TDD 32. TDD 32 has a keyboard 34, a visual display screen 36, and a cradle 38 for receiving a telephone handset.

Enclosure 30 is sized to receive the TDD 32. Enclosure 30 has a top 40, sidewall 42 and a bottom 44. Upon attachment to the housing 22, the back wall 20 and sidewall 24 of the housing 22 provide a back wall and side wall to enclosure 30. Enclosure 30 also has a front opening 46 (FIG. 1) sized to allow the TDD 32 to be inserted into the enclosure. A door 48 which is hingedly attached to the top 40 by hinge 50 is provided to allow closure of the front opening 46. A lip 52 extends across the bottom of the front opening 46 so that upon closure of door 48, the door 48 may be locked with lock 54 (FIG. 2), which turns a latch 56 pivotally mounted adjacent the bottom of door 48. Door 48 and lock 54 are provided to prevent theft or vandalism of the TDD 32. In those areas where sufficient security is provided to prevent theft or vandalism, enclosure 30 need not have door 48 or lock 54. In some locations, where it is considered desirable to close and lock the door 48 at night, a security officer may be provided with the key to open the door in the morning and close it at night.

Figure 3:
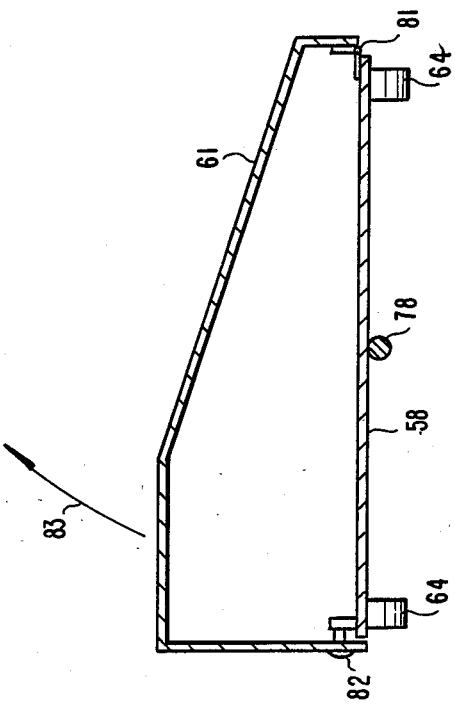
FIG. 3 is a longitudinal section through the shelf and cover showing some attachment details.

The TDD 32 is mounted to a shelf 58 by appropriate linear fasteners 60, such as rivets, metal screws, or a nut and bolt arrangement. To deter theft of and prevent damage to the TDD, a metal cover 61 of sufficient size and shape to enclose the TDD 32 is mounted over the TDD 32 and secured to the shelf 58 by appropriate means such as a piano-type hinge 81 at the front and a key-operated lock assembly 82 at center of the rear (FIG. 3). The key for the lock assembly 82 would be provided only to a TTD repair person who could unlock the lock and swivel the cover upward in the direction of arrow 83 for access to the TDD for repair or replacement. Metal cover 61 has an appropriately sized aperture 63 located therein to provide access to the TDD keyboard 34 and visual display screen 36. Metal cover 61 also has appropriately sized cradle apertures 65 and 67 located therein to provide access to the cradle 38 by the transmitter and receiver portions of the phone handset.

Shelf 58 is pivotally and slidably mounted to a bar 62 by brackets 64. Bar 62 is located parallel to and adjacent to sidewall 42 and bottom 44. A first portion 66 of bar 62 is located within enclosure 30. A second portion 68 of bar 62 is located outside of enclosure 30. A truss 70 attached to the outside end 72 of bar 62 connects the bar 62 in a displaced manner from sidewall 24 of housing 22. The inside end 74 is attached to back wall 20 of housing 22. It should be understood that inside end 74 could also be attached by a truss to either sidewall 42 or bottom 44 of enclosure 3 or sidewall 24 of the housing 22. Since bar 62 extends from outside of the enclosure 30 to inside the enclosure 30, an appropriate notch or hole 76 is provided in door 48 to accommodate passage of the bar 62 into the enclosure 30.

Referring further to FIGS. 1 and 2, it can be understood how device 10 is used by the deaf or hearimg impaired. The TDD 32 is stored in a vertical position (see FIG. 2) within the enclosure 30. When the TDD 32 is to be used, lock 54 is unlocked and door 48 is pivoted up from its closed position to the open position illustrated in FIG. 1. The TDD 32 is then pulled out of enclosure 30 in a vertical position until the TDD is completely outside the enclosure 30. This sliding action is accomplished because brackets 64 have apertures therethrough which are sized to encompass bar 62 but also to slide along the bar. Once the TDD 32 is completely outside of the enclosure 30, it is then pivoted about the bar 62 until it is in a horizontal position (see FIG. 1). In order to hold the TDD in a horizontal position there is a rod 78 affixed to the bottom of shelf 58. It extends downwardly beyond the shelf when the shelf is in its vertical position (see FIG. 2), but swings to the right and up as the shelf 58 swings to the left and down. When the TDD reaches the horizontal position, the bar 78 engages a stop 80 which is attached to sidewall 24 at an appropriate location. Thus, bar 78 and stop 80 prevent the TDD from rotating beyond a horizontal position. Once the TDD is in its horizontal position, the handset 16 may be removed from the phone 14 and placed in cradle 38. The pay phone 14 and TDD 32 are then used in their normal manner to provide communication for the deaf and hearing impaired. After using the TDD, the TDD 32 is again rotated to its vertical position and slid into enclosure 30 which may then be closed and locked. The bottom 44 of enclosure 30 is provided with a slot 79 extending to the front door 48 to accommodate movement of bar 78 to the front as the TDD is pulled out the front after door 48 is raised. The metal cover 61 may be affixed or locked to shelf 58 in a manner to inhibit theft of the TDD when it is out of the enclosure in the in-use position of FIG. 1.

Device 10 povides for storing a TDD securely to a telephone booth so that the TDD may be contained within an enclosure when not in use and may be removed from the enclosure and placed in a position sufficiently close to pay telephone 114 to allow the handset 16 to be received in the cradle 38 of the TDD for convenient use of the TDD.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A device for providing public telephone services to the hearing impaired comprising:
    a coin operated telephone mounted to a housing, said coin operated telephone having a handset;
    a telecommunications device for the deaf having a handset cradle designed and arranged to receive a telephone handset when said telecommunications device for the deaf is in use;
    an enclosure attached to said housing and sized to receive said telecommunications device for the deaf;
    positioning means attached to said telecommunications device for the deaf and said housing for positioning said telecommunications device for the deaf between a first position wherein said telecommunications device for the deaf is received within said enclosure and a second position wherein said telecommunications device for the deaf is adjacent said coin operated telephone so that said handset can be received in said handset cradle;
    said positioning means comprising sliding attachment means for sliding attahing said telecommunications device for the deaf to said housing so that said telecommunications device for the deaf can be slid between said first position and said second position;
    said positioning means further comprising a shelf and pivoting attachment means secured to said shelf for pivotally attaching said telecommunications device for the deaf to said sliding attachment means so that said shelf may be pivoted about said sliding attachment means between a horizontal position and a vertical position;
    said sliding attachment means comprising a bar attached to said housing, wherein a first portion of said bar is positioned within said enclosure and a second portion of said bar is positioned outside said enclosure; and
    said pivoting attachment means further comprising a bracket, said bracket attaching said shelf to said bar, said bracket having an aperture therein which surrounds said bar and is slidingly received thereon.

2. The device of claim 1 and further comprising an abutment on said housing and a stop rod on said shelf, said rod being abutingly engageable with said abutment when said shelf is pivoted to said horizontal position.

3. The device of claim 1 wherein said bar is cylindrical and said aperture is circular so that said bracket slides along and pivots about said bar.

* * * * *